United States Patent
Gentry et al.

(10) Patent No.: US 6,276,746 B1
(45) Date of Patent: Aug. 21, 2001

(54) AERODYNAMIC CLOSURE FOR WHEEL HOUSING LINER OF A VEHICLE AND METHOD OF APPLYING THE CLOSURE TO REDUCE DRAG

(75) Inventors: Garvin Gentry, Sterling Heights; George M. Claypole, Fenton; Michael J. Kutcher, Wixom, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/548,340

(22) Filed: Apr. 12, 2000

(51) Int. Cl.⁷ .................................................. B62D 37/02
(52) U.S. Cl. ..................... 296/180.1; 296/198; 280/851; 280/160; 280/159
(58) Field of Search ................... 296/198, 180.1; 280/851, 160, 159

(56) References Cited

U.S. PATENT DOCUMENTS

| 1,506,684 | * | 8/1924 | Staples | 280/851 X |
| 1,774,242 | * | 8/1930 | Schneider | 280/157 |
| 3,899,192 | * | 8/1975 | Reddaway | 280/851 |
| 4,361,606 | * | 11/1982 | Butler et al. | 280/851 X |
| 5,269,547 | * | 12/1993 | Antekeier | 280/851 X |

FOREIGN PATENT DOCUMENTS

| 0066478 | * | 3/1948 | (DK) | 280/851 |
| 0139345 A1 | * | 5/1984 | (EP) | 280/851 |
| 14279 | * | of 1909 | (GB) | 280/159 |
| 0170240 | * | 10/1921 | (GB) | 280/851 |
| 2074109 | * | 10/1981 | (GB) | 280/851 |
| 2158790 | * | 11/1985 | (GB) | 280/851 |
| 2227985 | * | 8/1990 | (GB) | 280/851 |

* cited by examiner

Primary Examiner—Joseph D. Pape
Assistant Examiner—Lori L. Coletta
(74) Attorney, Agent, or Firm—Anthony Luke Simon

(57) ABSTRACT

In a vehicle with a wheel housing, a tire and a wheel housing liner, a closure for the wheel housing liner comprising first and second brushes connected to the wheel housing liner, wherein the first brush is inside the wheel housing at a side away from a center of the vehicle near an outside periphery of a tire, and wherein the second brush is inside the wheel housing around a suspension opening contour, wherein the brushes reduce flow of outside air that enters the wheel housing and circulates in the housing, thereby reducing aerodynamic friction and increasing vehicle efficiency.

1 Claim, 2 Drawing Sheets

AERODYNAMIC CLOSURE FOR WHEEL HOUSING LINER OF A VEHICLE AND METHOD OF APPLYING THE CLOSURE TO REDUCE DRAG

FIELD OF THE INVENTION

This invention is related to wheel housing liners of wheeled vehicles. In particular, the invention relates to means within wheel housing liners to limit circulation of air inside the wheel housing when the vehicle is in motion which reduces aerodynamic losses and hence increases the efficiency of operation of the vehicle.

BACKGROUND OF THE INVENTION

Many attempts have been made in the past to reduce air circulation in the wheel liners of vehicles. This is because the more air that circulates in the wheel liners, the greater the aerodynamic losses. Wheel skirts have been tried to limit this circulation, both on steerable wheels and on non-steerable wheels. These have been tried in a number of combinations but have not proved durable enough for regular use.

It would be desirable to have an aerodynamic closure for a wheel housing that would be durable enough for regular use. An aerodynamic closure for a wheel housing of a vehicle must be demonstrably effective in reducing drag. It must be relatively low in cost to manufacture, and it must be capable of assembly in production.

SUMMARY OF THE INVENTION

One aspect of the invention provides an aerodynamic closure for a wheel housing liner comprising a pair of brushes connected to the wheel housing liner in positions that reduce the aperture between the wheel that is in the wheel housing and the outside of the vehicle. The brushes extend into the portions of the wheel hop area providing a barrier reducing the amount of outside air that enters the wheel housing and circulates in the housing to create aerodynamic friction. The result is an increase in vehicle efficiency. The brushes are flexible and provide little friction so that occasional contact by the vehicle wheel into the brushes during wheel hop events does not damage either the brushes or the wheel.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
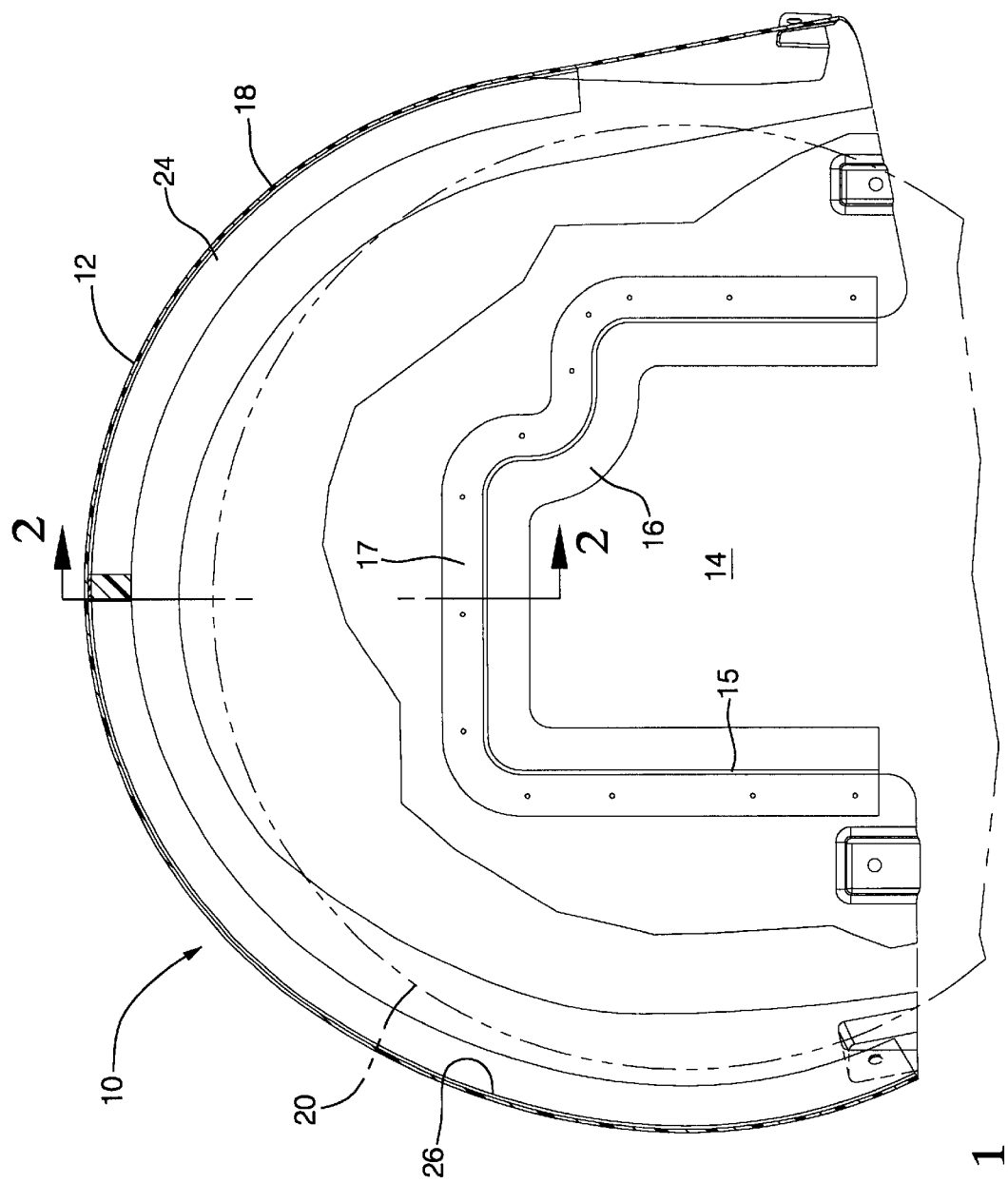
FIG. 1 is a side view of a wheel housing and liner of a vehicle showing the position of the brushes of one embodiment of the present invention.
Figure 2:
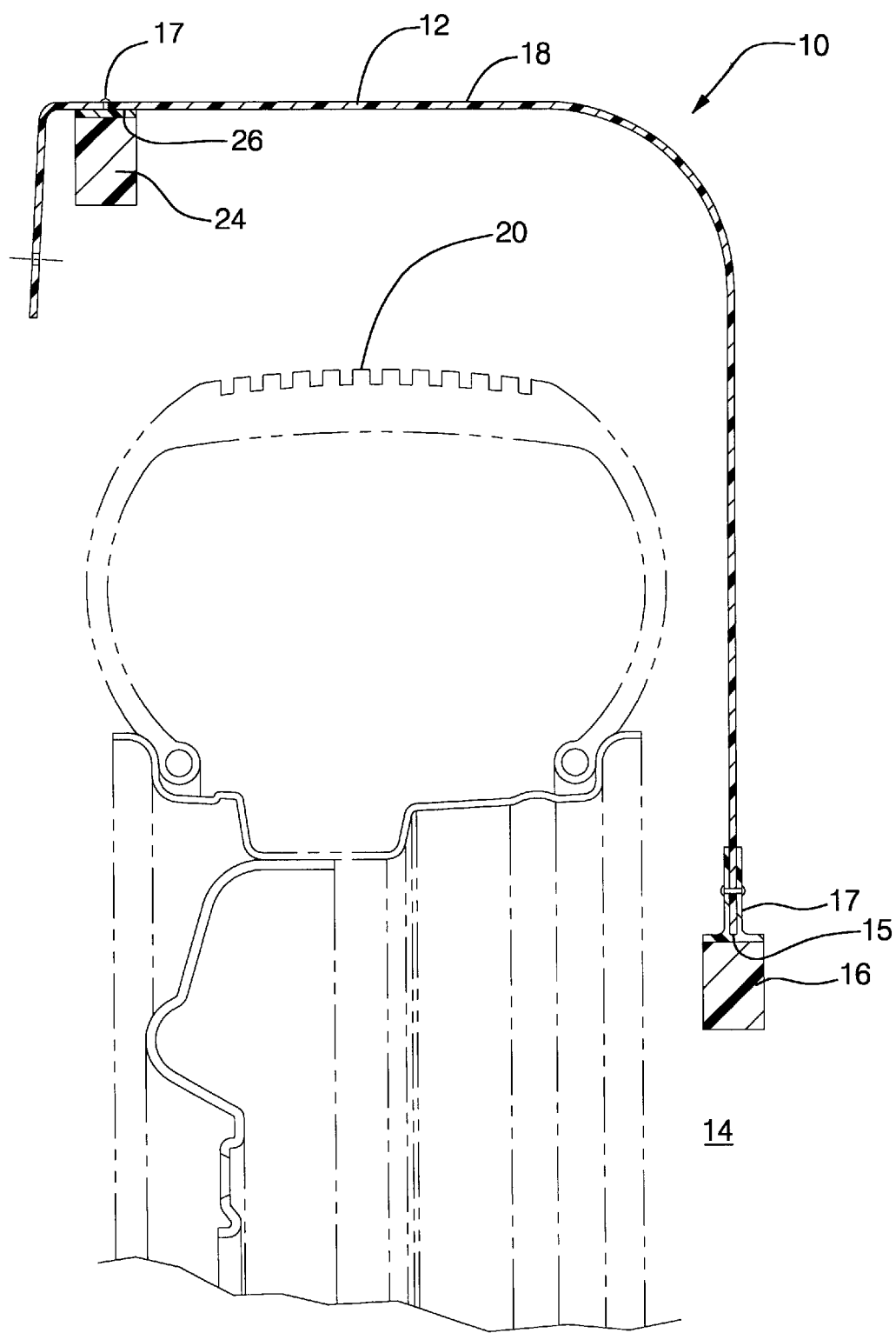
FIG. 2 is a sectional view of the wheel housing liner of FIG. 1, taken along section lines 2—2 of FIG. 1.

Referring to FIGS. 1 and 2, a wheel housing 10 and wheel housing liner 12 have a contour around the suspension opening 14 on the vehicle-center side of the wheel 20 through which the wheel axle and/or suspension components (not shown) pass and which is exposed to the outside air. A contour brush 16 is attached to the wheel housing liner 12 around the edge 15 of the suspension opening 14. In a preferred embodiment of the invention, the contour brush 16 was made of straight sections of a dense set of fibers of non-abrasive polypropylene set in a backing of neoprene or rubber. The contour brush may be attached to the wheel housing liner 12 using fastener 17, which may be any suitable conventional fastener or adhesive. In a preferred embodiment the fastener 25 comprises rivets (or alternatively industrial staples) which secure the neoprene or rubber backing of the contour brush 16 to the wheel housing liner 12. The contour brush 16 may alternatively be made of other non-abrasive and durable materials. The contour brush 16 may be shaped to follow the outer contour 18. The contour brush 16 is preferably positioned to reduce the aperture between the inside of the wheel housing liner 12 and the suspension and axle (not shown).

A wheel closure brush 24 is preferably attached inside the wheel housing liner 12 with fastener 17 (such as rivets) so as to follow the arcuate path of the inside contour 26 of the wheel housing liner 12, around a portion of the outer perimeter of the wheel 20 at the edge of the wheel 20 furthest from the centerline of the vehicle. The brush 24 is typically made of bristles of polypropylene or other plastic set in neoprene or rubber. The wheel closure brush 24 is also preferably made of a non-abrasive polypropylene with a neoprene backing, although it may also be made of other durable materials. The motion of the wheel 20 when the vehicle is moving may be such as to cause the wheel 20 to contact the brushes 16 or 24 from time to time, so the material used for the brushes 16 and 24 should be non-abrasive.

One embodiment of the present invention was built and tested on a vehicle in a wind tunnel. The brushes 16, 24 included non-abrasive polypropylene fibers that were 0.012 inches in diameter, about 20 mm in width, and 1.125 inches in length which were set in a backing of rubber or other material. The brushes were set back from the edge of the wheel opening by approximately 0.25 to 1.0 inch. The brushes were commercially obtained from The 3M Company. These brushes are of the type that when coated or combined with an abrasive are used to finish metal, to apply a satin finish or to debur metal. Abrasive brushes are made of polypropylene coated with silicon carbide or aluminum oxide or the like. The result of the test using non-abrasive polypropylene brushes was a measured reduction in drag compared to tests on the same vehicle without the brushes. The aerodynamic drag coefficient was observed to be reduced by 0.008.

While the embodiments of the invention disclosed herein are presently considered to be preferred, various changes can be made without departing from the spirit and scope of the invention. The scope of the invention is defined by the appended claims, and all changes that come within the meaning and range of equivalents are intended to be embraced therein.

What is claimed is:

1. A combination including: a wheel housing liner having an arcuate section around a portion of an outer perimeter of a wheel and an edge around a suspension opening; and first and second brushes connected to the wheel housing liner, wherein the first brush is inside the wheel housing liner attached to the arcuate section at a side near the outer perimeter of the wheel, and wherein the second brush is attached to the wheel housing liner at the edge around a suspension opening and extends into the suspension opening, wherein the first and second brushes reduce flow of outside air that enters the wheel housing liner and circulates in the wheel housing liner, thereby reducing aerodynamic friction.

* * * * *